Jan. 28, 1941.    W. H. CHURCHILL    2,229,996
ADJUSTABLE FASTENER
Filed Nov. 15, 1938

Inventor:
Wilmer H. Churchill.
by Walter S. Jones
Att'y.

Patented Jan. 28, 1941

2,229,996

UNITED STATES PATENT OFFICE 2,229,996

ADJUSTABLE FASTENER

Wilmer H. Churchill, Saugus, Mass., assignor to United-Carr Fastener Corporation, Cambridge, Mass., a corporation of Massachusetts Application November 15, 1938, Serial No. 240,465

2 Claims. (Cl. 85—5)

This invention relates to improvements in fastener members and installations of the same.

An object of my invention is the provision of an improved fastener member which is adjustably adaptable for securing together superposed apertured parts having different thicknesses.

Another object of my invention is the improved construction of my adjustable fastener member wherein it effects firmer engagement with the material of one of the parts to be secured together surrounding a circular aperture therein.

Other objects and uses of my invention will be apparent from inspection of the drawing and specification hereinbelow set forth.

Referring to the drawing, in which I have illustrated a preferred embodiment of my invention:

Figure 1:
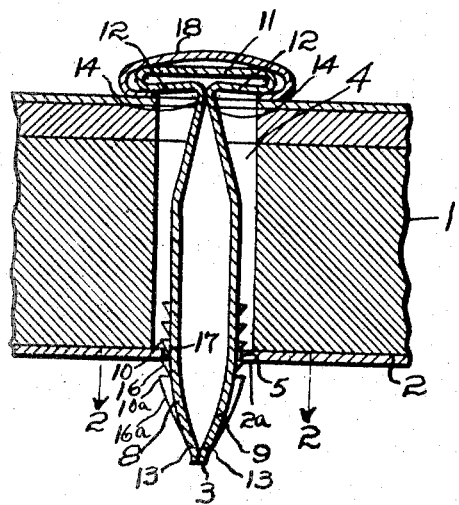
Fig. 1 is a section through an installation showing one use of my improved fastener.

Referring to Fig. 1, in which I have illustrated a preferred use of my invention, I have shown a part such as a floor mat or upholstery, which is indicated generally by the numeral 1, secured to another part such as the support 2, which may be the floor of an automobile, by means of the adjustable fastener member 3. The mat or upholstery 1 is disposed in superposed relation to the support 2 and has an opening 4 in alignment with a circular aperture 5 of the support. The fastener member 3 is constructed in a way to be adjustable to the differences in thickness and degree of resiliency of the floor mats used in different makes of automobiles and thus may be used interchangeably with different forms of mats or the like for securing them to supports having a predetermined maximum thickness. Although I have preferred to illustrate the use of my fastener in connection with securing a floor mat or the like to a support, I do not wish to limit the use of my fastener to this particular installation as it is effective for securing other parts together.

Figure 4:
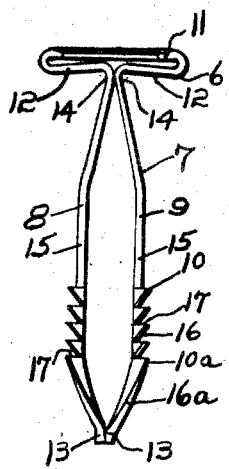
Fig. 4 is an edge view of the fastener member shown in Fig. 3.

The particular fastener member illustrated is formed from a single piece of metal and has a head 6 and a shank 7 formed of a pair of opposed ribbon-like yieldable legs 8 and 9. Series of teeth 10 extend from each of the legs 8 and 9 for ratchet engagement with the support 2 in a manner to be described. The head 6, in my preferred form, comprises a substantially flat portion 11 having portions 12—12 extending inwardly from opposed ends of the portion 11 toward the center. The legs 8 and 9 are joined to the innermost ends of the inwardly-extending portions 12—12 and extend outwardly in substantially right-angular relation to the general plane of the head with inner broad surfaces in facing relation, as most clearly shown in Fig. 4. The legs 8 and 9, in my preferred form, diverge from the inwardly-extending portions 12—12 of the head and then converge toward their free ends 13—13. The free ends 13—13 abut each other normally or upon slight movement of the legs toward each other. It will also be noticed that portions 14—14 of the legs 8 and 9 adjacent their junctions with the inwardly-extending portions 12—12 normally abut, or may abut, during movement of the legs toward each other with the result that the abuttable portions 14—14 combine with the abuttable portions 13—13 to "stiffen" the action of the shank when the legs are compressed toward each other during passage thereof through the aperture 5 of the support 2.

Figure 2:
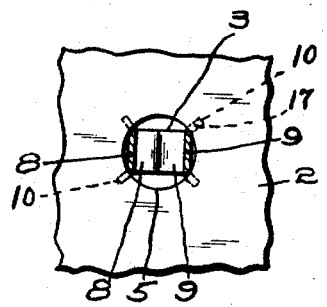
Fig. 2 is a plan section taken along the line 2—2 of Fig. 1.
Figure 3:
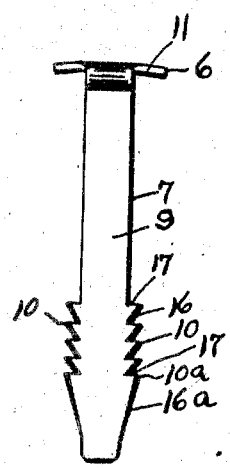
Fig. 3 is a side view of the fastener member per se.
Figure 5:
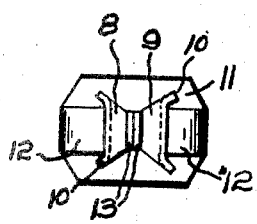
Fig. 5 is a bottom end view of the fastener shown in Fig. 4.

A series of spaced teeth 10 is provided adjacent opposed narrow edges 15 (Fig. 4) of each of the legs 8 and 9. Each of the teeth 10 is formed to provide an inclined edge 16 for engaging material adjacent the aperture 5 of the support during passage of the shank therethrough for compressing the legs 8 and 9 and a shoulder 17 substantially facing the fastener head 6 for engaging the outer surface 2ª of the support 2 adjacent the aperture 5. The inclined edges 16ª of the teeth 10ª nearest the free ends 13—13 of the legs 8 and 9 are extended and act as a guide for the purpose of expediting the use of the fastener, as will be understood by those skilled in the art. It is important to notice that the teeth 10 of each of the series are projected out of the plane of their respective legs to form a predetermined angle with the plane so that the series of teeth adjacent the four edges of the legs extend as nearly as is possible in radial directions, as most clearly shown in Figs. 2 and 5. Thus the series of teeth 10 adjacent the edges of one leg project out of the plane of the leg in a direction away from the other leg. As a result of the aforesaid radial disposition of the series of teeth, the shoulders 17 of the teeth present a maximum surface for engaging the outer surface $2^a$ of the support adjacent the circular aperture 5, as will be understood by those skilled in the art. It should be understood, however, that I do not wish to be limited by the exact radial arrangement of the series of teeth illustrated and described as this is only a preferred construction for most efficient engagement of the teeth with a support having a circular aperture. It will be noticed that the inclined edges $16^a$ of the teeth $10^a$ are twisted from their farthest laterally-disposed position adjacent the respective shoulders 17 into the plane of the legs at their extremities nearest the free ends 13—13 of the legs.

In assembling the parts of the installation, the shank of the fastener is moved through the aperture 4 of the part 1 to engage the inclined edges 16 of the teeth with the wall of the aperture 5 of the support 2. Upon continued movement of the shank axially of the aperture 5, the inclined edges 16 pass through the aperture 5, at the same time compressing the legs 8 and 9 of the shank until the inclined edges have passed entirely through the aperture, at which time the legs expand to engage proper respective shoulders 17 behind the outer wall $2^a$ of the support. Thus the mat 1 is held in place by the head 6 of the fastener and the tightness and rigidity of the installation may be regulated to take up variances in the resiliency and thickness of the parts through the adjustable feature of the fastener shank. It will be noticed that portions of the legs 8 and 9 having the series of teeth 10 are substantially parallel thereby effecting equal tension of the sets of teeth at the different engagement levels. If desirable, a cap 18 (Fig. 1) may be applied to the head 6 of the fastener so as to lend an attractive finished appearance to the fastener when it is used on an installation such as that shown in the drawing.

Although I have illustrated and described a preferred embodiment of my invention, I do not wish to be limited thereby because the scope of my invention is best defined by the following claims.

I claim:

1. A fastener stud member formed from sheet metal and having a base portion and a shank of generally rectangular cross-section, said shank comprising a pair of relatively long bowed legs joined only by said base portion, said legs being formed from relatively thin metal and being many times greater in width than in thickness with their widest faces opposing each other and spaced apart for at least the greater portion of their lengths to be yieldable by a flattening of the bowed portions, said legs abutting each other adjacent the base and near their free ends to stiffen the shank, and each leg having a series of teeth extending at an angle outwardly beyond the plane of said legs and from at least one edge thereof for engagement with an apertured part, said teeth extending diagonally beyond the general rectangular margins of said shank as defined by a cross section through said bowed portions.

2. A fastener member formed of sheet metal and having a base portion and integral shank of generally rectangular cross-section, said shank comprising a pair of legs of relatively thin strip metal joined only at the base portion with their wide faces opposing each other, said legs being bowed intermediate their ends, permitting abutment between opposed legs adjacent the base and near their ends with the intermediate bowed portions spaced apart and being yieldable upon a compression of the bowed portions, and each leg having a series of teeth extending at an angle outwardly beyond the plane of the leg and from at least one edge thereof for engagement with an apertured part, said teeth providing a yieldable locking region above said abutting ends, the lowermost tooth tapering in width toward the adjacent leg end and being twisted into the plane of the legs at its extremity adjacent the leg ends.

WILMER H. CHURCHILL.